United States Patent [19]

Batdorf

[11] 4,180,166

[45] Dec. 25, 1979

[54] PATCHING KIT WITH AGGREGATE AND TWO-PART EPOXY BINDER SYSTEM

[75] Inventor: Vernon H. Batdorf, Minneapolis, Minn.

[73] Assignee: H. B. Fuller Company, St. Paul, Minn.

[21] Appl. No.: 959,510

[22] Filed: Nov. 13, 1978

[51] Int. Cl.$^2$ .............................................. B65D 81/32
[52] U.S. Cl. .................................. 206/568; 206/219; 427/140; 427/385 C; 427/386; 427/387; 528/93
[58] Field of Search ................... 427/386, 385 C, 136, 427/140, 387; 52/514, 415, 177; 528/93, 88; 206/219, 568

[56] References Cited

U.S. PATENT DOCUMENTS

| | | | |
|---|---|---|---|
| 2,943,953 | 7/1960 | Daniel | 427/386 X |
| 3,658,728 | 4/1972 | Hoffmann et al. | 260/2 N |
| 3,728,302 | 4/1973 | Helm | 260/37 EP |
| 3,850,661 | 11/1974 | Dreher et al. | 427/386 X |
| 4,022,946 | 5/1977 | Cummings | 428/413 |
| 4,055,541 | 10/1977 | Riew | 427/386 X |
| 4,088,633 | 5/1978 | Gurney | 260/47 EN |

FOREIGN PATENT DOCUMENTS

| | | | |
|---|---|---|---|
| 2301617 | 7/1973 | Fed. Rep. of Germany | 260/37 EP |
| 1258454 | 12/1971 | United Kingdom | 260/37 EP |

OTHER PUBLICATIONS

Chem. Abs. 72:32695h (1970).

*Primary Examiner*—Michael F. Esposito
*Assistant Examiner*—Thurman K. Page
*Attorney, Agent, or Firm*—Merchant, Gould, Smith, Edell, Welter & Schmidt

[57] ABSTRACT

The disclosed method for applying an epoxy mortar is highly streamlined and involves little more than blending the curable epoxide binder for the mortar, adding aggregate and water to form the mortar, spreading the mortar on a surface, and curing the mortar in place on this surface. Flood coats, special trowelling techniques, and hydrophobic coatings for the aggregate particles are usually unnecessary. The simplification of the mortar-applying method depends upon formulating an epoxy binder material which includes a polyfunctional primary amine having an extremely low affinity for water, particularly a polynuclear cycloaliphatic polyamine such as methylene-bis-(4-cyclohexyl amine). A suitably formulated epoxy binder composition of this invention has a reasonably lengthy pot life, insensitivity to water, a relatively strong incompatibility with water (including the tendency to drive water out of a water/mortar emulsion so that the water forms a separate phase on the top surface of the mortar), good tensile and compressive strength after curing or hardening of the epoxy resin, a relatively low viscosity and easy spreadability during much of the pot life, and a high degree of lubricity with respect to metal trowels or other spreading tools.

13 Claims, No Drawings

PATCHING KIT WITH AGGREGATE AND TWO-PART EPOXY BINDER SYSTEM

BACKGROUND OF THE INVENTION

This invention relates to an epoxy binder system for an epoxy mortar. An aspect of this invention relates to the resulting mortar and a method for preparing it and then applying it to surfaces such as floors. Still another aspect of this invention relates to a patching compound or patching kit which includes all of the components necessary to prepare the mortar.

Description of the Prior Art

It is well known that curable epoxide formulations can be used to provide tought, solvent-resistant coatings on surfaces such as floors. There are many floor toppings (both purely utilitarian and decorative) on the market today which are based upon epoxy resin (i.e. curable epoxide) technology. For example, there are many industrial operations in which concrete floors are not fully adequate. Although concrete is ordinarily an excellent construction and flooring material, it can be attacked by certain chemicals and it may be difficult to keep sufficiently clean in those environments in which high standards of cleanliness are important, e.g. food-handling operations, medical-surgical rooms, so-called clean rooms, and the like. A common practice, typically when applying an epoxy floor topping to concrete or similar hard surfaces is to formulate an epoxy resin mortar. The objective here is to provide a composition which can be trowelled or spread by some similar technique, much like any common siliceous mortar. However, the trowelling operation is ordinarily more difficult in the case of an epoxy resin mortar. A siliceous or calcareous mortar (e.g. one containing a hydraulic cement and/or lime and/or other calcium-containing compounds such as gypsum, generally mixed with silica sand or some similar aggregate) can be blended with water to form a plastic, non-sticky, easily spread material which is easily trowelled to a smooth, "tight" (relatively non-porous) surface. It is difficult to match the spreadability of such conventional mortar mixes with the presently available epoxy resin mortars.

The epoxy chemist presently has available to him a number of expedients which will make typical curable epoxide compositions relatively insensitive to water; accordingly, it is known to blend water (as well as various conventional aggregates such as sand) into the epoxy mortar mix. However, even the presence of water in the epoxy resin mortar may not be sufficient to overcome difficulties in spreading or trowelling the mortar. These difficulties can detract from the appearance of the finished floor. Hard trowelling may be required in order to get the floor surface smooth and "tight". It is very common for these epoxy floor toppings to tear during trowelling and to leave porous areas throughout the floor as well as many obvious trowel marks from the finished trowelling. A common practice is to treat the finished epoxy surface with a so-called flood coat of epoxy binder the day after trowelling, so that the porous areas will be filled in and the trowel marks will be better covered up. The initial hard trowelling and the flood coating steps tend to be labor-intensive and reduce the practicality of epoxy-based floor toppings.

Despite these difficulties, epoxy-water mortars, sometimes referred to as epoxy-water slurry mortars have continued to attract the interest of civil engineers and construction and building tradesmen. The epoxy resin itself has many advantageous properties which are highly regarded by those in the construction industry, including high mechanical strength, excellent chemical resistance, good dimensional stability, and good adhesion to a wide variety of substrates (flooring, walls, road surfaces, etc.). If only light traffic is expected, a coating of epoxy floor paint considerably less than 1 mil (25 microns) in thickness can provide good protection for metal, wood, and concrete surfaces. For heavy traffic areas, much greater thicknesses (typically well over a millimeter) are required. There is almost no upper limit on the thickness of a trowelled epoxy mortar floor; hence, this technology often finds application in such heavy traffic areas. Trowelled floors up to a centimeter in thickness are not uncommon. These floors have high compressive strength, flexural strength, and impact and abrasion resistance. Thus, the use of epoxy-water slurry mortars, particularly as floor toppings would greatly increase if the labor-intensive trowelling and smoothing and flood coating operations could be simplified.

One approach to simplifying these operations was suggested relatively recently in *Proceedings of the First International Congress on Polymer Concretes*, the article being entitled "Polymers in Concrete" by I. Makansi of Shell Research Ltd., Holland and C. E. L. Reader of Shell International Chemical Co., U.K. The section of this article entitled "Epoxy Water Slurry Mortars" discusses "EWS-Mortar" which contains sand pretreated with a coating to make it hydrophobic. This is accomplished by coating the sand with an epoxy-polyamide coating which is allowed to cure on the sand before the mortar is made up. Such a coating operation adds a somewhat cumbersome step to the manufacture of the components of the mortar and makes the total mortar composition less competitive as compared to one containing only uncoated aggregate. An apparent requirement of the EWS-Mortar system is that the water be prethickened to help hold it in the mortar during spreading or trowelling. Absent the prethickening, it appears likely that the water will come out to the surface of the mortar too quickly to act as a lubricant for good spreadability or trowelling. In order to provide an epoxy binder which is not water sensitive, the developers of the EWS-Mortar system apparently selected an epoxy binder system with a rather short pot life, e.g. about ten minutes. This short pot life is not practical for all applications of epoxy-water slurry mortars, and many building and construction tradesmen would prefer longer pot lives. Based upon the aforementioned Makansi et al article, at a loading of 8:1 by weight of silica sand to binder, the mortar had a tensile strength of 380 p.s.i. and a compressive strength of 1,590 p.s.i. Actual tests by the applicant show that this EWS-Mortar system has properties somewhat better than this—a tensile strength of 400 p.s.i. and a compressive strength of 2,230 p.s.i. Such tensile and compressive strengths are not adequate for all epoxy flooring applications, however, and many building and construction tradesmen prefer a minimum of 7,500 p.s.i. compressive strength and 1,750 p.s.i. tensile strength.

Although the focus of this discussion has been upon recent developments in the field of epoxy resin mortars and floor toppings, this particular art is not new. It has long been known that a prewet inert aggregate such as sand can be combined with an epoxy resin composition to form a low viscosity paste-like flooring compound. See, for example, U.S. Pat. No. 2,943,953 (Daniel), issued July 5, 1960.

Epoxy resin hardener systems have been designed specifically for hardening or curing on wet surfaces, surfaces immersed in water, and/or concrete; see, for example, U.S. Pat. Nos. 4,022,946 (Commings), issued May 10, 1977; 4,088,633 (Gurney), issued May 9, 1978; and 3,850,661 (Dreher et al), issued Nov. 26, 1974; and British Pat. No. 1,258,454 (Becker), published Dec. 30, 1971. In fact, curable or hardenable aqueous epoxy resin emulsions have been prepared; see Chem. Abs. 72:32695h (1970).

The epoxy resin art ranges far and wide beyond the totality or any portion of the preceding discussion, and it would be difficult to provide even a representative sampling of the field of epoxy technology, particularly in view of the enormous utility of these materials (e.g. as adhesives), castings, potting compounds, etc.). Needless to say, a wide variety of amine hardening agents has been used with an equally wide variety of curable epoxide monomers, prepolymers, etc. The following references are of interest for their disclosure of di-primary amine curing agents, even though they are drawn from relatively unrelated areas of epoxy technology: U.S. Pat. No. 3,658,728 (Hoffmann et al), issued Apr. 25, 1972, and U.S. Pat. No. 3,728,302 (Helm), issued Apr. 17, 1973.

SUMMARY OF THE INVENTION

This invention contemplates an attempt to deal with several of the prior art problems without necessarily coating or otherwise treating the aggregate. The epoxy resin composition and hardener or curing agent have been selected and/or formulated for a reasonably lengthy pot life, insensitivity to water, a relatively strong incompatibility with water (including the tendency to drive water out of a water/mortar emulsion so that the water forms a separate phase on the top surface of the mortar), good tensile and compressive strengths after curing or hardening of the epoxy resin, a relatively low viscosity and easy spreadability during much of the pot life, and a high degree of lubricity (particularly with respect to metal trowels or other spreading tools), which lubricity is believed to be imparted to the mortar by the water component. In the quest for these and other desiderata, it has now been found that one key area of concern is the degree of affinity for water possessed by the primary amino ($-NH_2$) groups of the agent used to cure or harden the epoxy resin. It has been found that suitable amine curing agents should be polyfunctional amines capable of providing a very hard (highly crosslinked) cure through at least two primary amino groups, which primary amino groups have an extremely low affinity for water. Although higher-alkyl amino groups have a low affinity for water, to meet all of the requirements for a system of this invention, it has been found that at least about one out of every two primary amino groups present in the epoxy resin mortar should be cycloaliphatic-amino in nature, i.e. a ring-substituted cycloaliphatic amine functional group. The selection of a polyfunctional amine which meets these criteria is not straightforward. Monocyclo cycloaliphatic di-primary amines typically have too strong an affinity for water to be useful in the present invention. Excessive affinity for water is particularly likely to occur if the primary amine functional group is isolated from the cycloaliphatic ring by a methylene group. For example, 1,4-cyclohexanebis(methylamine) is soluble in all proportions in water. Cyclohexylamine is also water soluble. However, it has been found that a sufficient degree of incompatibility with water is obtained with a polynuclear cycloaliphatic polyamine having a primary amine functionality greater than one but less than four. At least one of every two—more preferably at least half—of the primary amine groups present in the epoxy binder for the epoxide mortar should be provided by the substantially water insoluble polynuclear cycloaliphatic polyamine. The hydrophobic character of the system is further increased with suitable hydrophobic agents, which agents can be reactive in the system, if desired. With this high degree of hydrophobic character, the epoxy resin mortar has a tendency to reject a substantial portion of entrapped water—even emulsified water. As a result, at least a portion of the substantially incompatible water phase included in the mortar has a strong tendency to form a film of water on the top or free surface of the mortar.

Accordingly, this invention contemplates a method for coating a surface such as a floor with an epoxide mortar, which method comprises the steps of:

A. blending together the aforementioned water insoluble polynuclear cycloaliphatic polyamine with the hydrophobic agent and a substantially water insoluble, curable vicinal epoxide composition (e.g. a polyglycidyl ether of a polyhydric phenol), B. adding at least 200 parts by weight of aggregate and a lubricating amount of water to each 100 parts by weight of the above-described epoxide blend (which epoxide blend serves as a curable epoxide binder for the aggregate), thereby obtaining a curable epoxide mortar containing a substantially incompatible water phase generally uniformly distributed through the epoxide mortar, C. spreading a layer of the epoxide mortar onto a surface and permitting the aforementioned water phase-out to occur (i.e. at least a portion of the water phase is rejected and tends to form a film of water on the top or free surface of the layer), and D. curing or hardening the curable epoxide binder material to a thermoset solid. This curing or hardening step can be completed under normal ambient conditions in a matter of hours or, at most, days.

Outstanding results are obtained in this method when the curable epoxy binder system has a low viscosity and is relatively free of non-reactive diluents. The viscosity of the curable epoxide can be significantly reduced with amine-reactive diluents, such as any of the commercially available low viscosity aliphatic glycidyl or polyglycidyl ethers. The hydrophobic agent can be epoxide-reactive, and an outstanding improvement in both the spreadability and hydrophobic properties of the mortar is obtained with a substantially water insoluble N-higher aliphatic-alkylenediamine, at least in those cases where the contribution of primary amine groups from the hydrophobic agent is carefully balanced against the contribution from the substantially water-insoluble, polynuclear cycloaliphatic polyamine. An outstanding combination of epoxide hardening characteristics, hydrophobic properties, low viscosity, and the like is obtained when a nonfused-ring, di-primaryamino-bicycloalkane is used as the cycloaliphatic polyamine.

A patching kit can be prepared according to the principles of this invention by including within the kit both the curable epoxide binder (normally as a two-package system) and a quantity of sand or other aggregate, preferably prewet with a lubricating amount of water.

Definitions

Throughout this application, the following terms have the indicated meanings:

"Compatible" and "compatibility" both refer to the degree of polar or non-polar character shared by two different compounds or functional groups. "Compatible" compounds tend to be mutually soluble in each other, at least to some degree, and in any event share a similar amount of polar or non-polar character, as the case may be. A high degree of solubility is not required for "compatibility", however. If one compound is easily emulsified in another or tends to form a stable dispersion in another (e.g. because of micelle formation or the like), some "compatibility" may be present, even though the mutual solubility between the compounds (or "phases", if a multitude of compounds is present) is very low.

"Substantial incompatibility" and "substantially incompatible" both refer to situations in which the compatibility between two or more compounds or phases is extremely low. For example, when a water phase is "substantially incompatible" in a binder or mortar, this phase has a tendency to separate out into a separate layer, even when initially dispersed or emulsified in the binder or mortar.

"Uniformly distributed" means dissolved, dispersed, emulsified, or uniformly suspended as a multitude of small, discrete particles or droplets.

"Curing" and "hardening" are used more or less synonymously to refer to the process by which a low molecular weight epoxide is greatly increased in viscosity (or, more typically, solidified or gelled), through increasing the molecular weight and the cross-link density of the epoxide. In the field of epoxy floor toppings, an epoxide mortar is considered cured when the curing reaction has proceeded to the point where a tough, extremely hard thermoset solid is obtained.

"Lubricating amount of water" refers to water blended into an epoxide mortar to give the mortar a quality of lubricity with respect to trowels or other spreading tools. (A mortar which tends to stick to a trowel is very difficult to spread out and be smoothed to a surface generally free of trowel marks.) A "lubricating amount of water" is an amount sufficient to provide this lubricity.

DETAILED DESCRIPTION OF THE INVENTION

The method of this invention and the components specifically selected for use in the method will now be described in greater detail. It should be remembered throughout this description that the theory behind the selection of components is not fully understood. Even the basic theory of epoxide chemistry is not always completely understood, although it is generally believed by most experts in this field that the vicinal or 1,2-epoxide ring (also called the oxirane ring) can be opened by interaction with a compound having an available unbonded pair of electrons. Once the ring is opened, the door is opened to further reactions with active hydrogen bearing substituents. The term "active hydrogen", in this context, refers to hydrogen atoms which are active according to the Zerewitinoff test, J. Amer. Chem. Soc. 49:3181 (1927). When the electron pair-containing compound is an active hydrogen-bearing amine (i.e. a primary or secondary amine), both the electron pair on the nitrogen and the active hydrogen can participate in the reaction; hence the active-hydrogen equivalent weight of an amine can be considered a measure of its effective equivalent weight in epoxide-amine reactions. However, one or both —$NH_2$ hydrogens may react more rapidly than an —NHR hydrogen, and total reliance upon active-hydrogen equivalency may be misleading. For convenience of description, the term "amino equivalents" will be used to refer to equivalents of amine functional groups, regardless of whether they are primary or secondary. By this definition, 1,4-butanediamine would have essentially the same number of "amino equivalents" as N-methyl-1,3-propanediamine, even though the first of these compounds has two primary amine groups, while the second has one primary amino and one secondary amino substituent. Accordingly, an "amino equivalent weight" is defined herein as the molecular weight of the amine divided by the number of "amino equivalents".

There is no perfect term for denoting a primary and-/or secondary amine hardener or curing agent. In addition to being called "hardeners" and "curing agents" or "curatives", they are also called "co-curatives" and "co-reactants". In any event, the primary or secondary amino functional group is reactive with the epoxide or oxirane ring, and the result of this reaction is an increase in molecular weight and, most typicaly, cross-linking effects which yield a thermoset resin.

The curable epoxide is also referred to in various ways. A common practice is to refer to liquid polyglycidyl ethers of polyhydric phenols as "epoxy resins", even though in other branches of "resin" technology such compounds might be referred to as "monomers" or "prepolymers".

Although this invention is not bound by any theory, it is reasonably apparent that certain factors are particularly important to the outstanding capabilities of the present invention.

First, the active-hydrogen containing component of the epoxy binder system requires a curing agent which has ring-substituted primary amine cycloaliphatic character but which is also substantially water insensitive. That is, the —R—$NH_2$ portion of the polyamine curing agent should apparently have as little associated water as possible. It further appears that water-soluble polyamines have far too much water associated with the amino functional groups, whereas substantially water insoluble polynuclear cycloaliphatic polyamines are relatively free of associated water. The water insensitivity of epoxy binder compositions of this invention is such that good curing can be obtained in the presence of water, but without excessively reducing the pot life of the epoxy binder system.

Second, the epoxy binder system must not have a tendency to form water-in-oil emulsions (or other water-containing emulsions) which are excessively stable. The water insensitivity and substantial water insolubility of the amine curing agent is believed to make a contribution to the behavior of the system in this regard also. In any event, the system as a whole does not absorb water easily and, insofar as it emulsifies water present in the mortar, the resulting emulsion is not sufficiently stable to prevent release of an aqueous phase to the top or the free surface of the mortar. It is believed that, when the epoxy binder system is blended with water (the water can be introduced by prewetting the aggregate and adding the aggregate to the binder), the water forms a second phase of tiny beads or droplets more or less uniformly distributed throughout the mortar. This initial distribution of water is not completely stable, particularly after the mortar has been spread out. During spreading, however, a great deal of the water present in the mortar does retain this uniformly distributed second phase configuration, which is believed to serve like a multitude of liquid ball bearings which make for ease in spreading out the mortar. Once the mortar has been spread out and the worker starts to compact it, it appears that more than one-fourth and probably approximately one-half of the water rises to the surface to form a film which allows the trowel or other spreading tool to float on top of the mortar. This film of water provides a high degree of lubricity with respect to the spreading or smoothing tool, and little or no epoxy binder sticks or transfers to the tool. Workmen gliding the trowel over the mortar experience very little sensation of drag, and very little pressure on the trowel is required to smooth out the mortar and "close it off" or make it "tight". Pinholes or void areas in the surface are rare despite a fairly lean ratio of aggregate to binder. Since, normally, 50 to 60% of the water rises or moves to the free or exposed surface of the mortar during trowelling, it must be assumed that a considerable amount (perhaps as much as one-half) of the original water still remains in the mortar as tiny droplets. Whether or not this presumably entrapped water eventually evaporates or otherwise removes itself from the cured epoxy mortar structure is presently undetermined. In any event, for reasons which cannot presently be explained, the presence of the entrapped water does not appear to detract from the high strength of the cured epoxy binder composition. Nor does the thickness of the mortar appear to affect the strength of the material; for example, test samples of up to about one inch (about 2.5 cm) thickness shows very high strength properties.

Third, the epoxy binder system of this invention is believed to have the ability to bind strongly to the aggregate selected for the mortar (e.g. silica sand) and suitable flooring bases or substrates such as concrete. The use of a silane adhesion promoter can make a substantial contribution to these strong bonds with concrete, sand, and the like. But another factor which appears to be extremely important also is the highly hydrophobic character of the epoxy binder system. Because aggregates such as silica sand have a high affinity for water, one might expect water to become preferentially absorbed onto the surface of the aggregate particles in a manner which could interfere with bonding between the aggregate and the surrounding binder or binder matrix. Concern about such preferential absorption is believed to be one of the reasons for the aforementioned prior art practice of treating the sand particles with a hydrophobic agent. For reasons which cannot be explained, however, the strength of cured samples made according to this invention does not appear to be improved by use of sand coated with hydrophobic agents; indeed, some available data actually suggests that this prior art practice may detract from bonding strength. In any event, in the present invention, the epoxy binder is apparently well absorbed or adsorbed by the surfaces of the aggregate particles.

The Method of This Invention

The basic method steps of this invention involve blending the curable epoxide binder for the mortar, adding aggregate and water to form the mortar (preferably the aggregate and water are not preblended before being added), spreading the mortar on a surface, and curing the mortar in place on this surface. Important aspects of the blending step include the selection of a suitable amine curing agent, as previously explained, and including a suitable hydrophobic agent. The preferred practice of the blending step involves the use of a two-part or two-package curable epoxide system. The first part or "Part A" contains curable epoxide rings and is sometimes referred to as the "epoxy resin" part. The second part ("Part B") includes the amine curing agent. The hydrophobic agent can be reblended with either Part A or Part B, depending upon its physical and chemical characteristics. For example, if the hydrophobic agent is amine-terminated, it would be preblended with Part B. This preblending of the hydrophobic agent provides advantages which will be discussed in detail subsequently. The Part A and Part B can be blended on the job with a slow speed electric drill provided with a paint-mixing attachment, bird-cage paddle, or the like. Blending of the two parts (including hydrophobic agent) takes only a few minutes (e.g. 1–15 minutes, preferably less than 10 minutes).

The blended binder is now ready to be poured into a conventional mortar mixer. Since the mixed binder (Part A+Part B) has a Brookfield viscosity at 25° C. which is normally less than 3,000 centipoise (c.p.s.) and more typically less than 2,000 centipoise, and since the gel time of the mixed binder is considerably longer than 10 minutes and more typically longer than 30 minutes, no special complications are ordinarily encountered during the pouring of the blend into the mortar mixer or in any subsequent mixing steps. The aggregate and water are mixed with the blended binder in the mortar mixer for several minutes, preferably a minimum of two minutes. Although this invention is not bound by any theory, it is believed that the water becomes distributed through the mortar as tiny droplets during this mortar mixing step.

When the mortar is spread on the floor, deck, or other surface, small piles of mortar can be distributed across the floor, and a suitable spreading tool such as a rake, come-along, or trowel can be used to flatten out the piles into a layer of mortar ranging from about 1 millimeter up to as much as 2 or 3 centimeters thick. There are no insuperable technical barriers to making floors of even greater thickness than 2 or 3 centimeters, since cured samples of this thickness show excellent compressive and tensile strength. However, cost factors normally dictate that the floor topping will be less than one centimeter thick. Thicknesses substantially less than one millimeter (e.g. 100 microns or less) are more easily provided with several coats of epoxy floor paint; hence, many of the advantages of this invention are geared to relatively thick layers of a millimeter or more. The entire spreading step can be done using essentially hand labor and appropriate tools; however, power tools are also available for this purpose. Regardless of the tools used, it is ordinarily inadvisable to leave the evenly distributed piles of mortar unspread for any considerable length of time. As is well known in the art of epoxy chemistry, the gel time is shorter in a large mass of material, particularly as compared to a layer on the order of a few millimeters thick. The spreading step can be considered to comprise two operations which overlap to such a degree that it may be difficult to distinguish between time. The first operation is spreading the mortar into the form of a coating on the order of a few millimeters thick, and the second operation involves trowelling or some other smoothing step which causes the upper or free surface of the mortar to become very "tight" or nonporous. During the first operation, the water uniformly distributed in the mortar reduces internal friction or otherwise facilitates spreadability. During this spreading operation, a substantial portion of this dispersed or suspended water phase tends to "phase out" and form a film of water on the top or free surface of the mortar layer, as explained previously. During the second or smoothing operation, this film of water is believed to reduce or eliminate drag caused by sticking of the mortar to the trowel or other spreading tool.

The aforementioned hydrophobic agent apparently helps to insure formation of the film of water by facilitating at least partial separation of the water phase from the mortar.

Since the curing of the curable epoxide mortar takes place in situ on the floor, deck, or other surface, the use of anything other than normal ambient curing conditions is not practical. If the floor, deck, or other substrate is not indoors or in a temperature-regulated area, the method of this invention should nor ordinarily be attempted at ambient temperatures below 10° C.; normal room temperature (20°-25° C.) is preferable for completing the cure in a reasonable time. Preferred epoxide mortar compositions of this invention can cure more or less completely at 20°-25° C. in 24-48 hours. It is also generally true for these preferred compositions that the cure has advanced sufficiently within about 8 hours cure time to support a limited amount of foot traffic. Typically, the cured mortar is ready for full service after about 24 hours cure time. With respect to temperature, the temperature of the substrate should also be considered and should be generally in the same range as the temperature of the atmosphere. Although epoxy mortar compositions of this invention are relatively insensitive to atmospheric humidity, a good rule of thumb is to attempt to keep humidity levels below 80% R.H.

As is known in the art, various surface preparation steps can be beneficial when the substrate (floor, vertical surface, etc.) is concrete. Among these conventional steps are acid etching, priming, sand blasting, grinding, and the like. Finishing steps subsequent to the curing step can be used advantageously in this invention, although they are normally not required. Among such optional finishing steps is the application of a seal coat.

The aforementioned basic method steps also apply to the use of epoxy mortar compositions of this invention as crack patching agents, fillers, grouting materials, and the like. Of course, during the "spreading" step, slightly different tools may be used, and additional steps such as removal of excess patching or grouting material may be involved.

These same basic method steps also apply to the coating of a surface with a decorative mortar. A decorative mortar can be considered to be substantially the same as any other curable epoxide mortar, except that at least part of the aggregate is selected for various colored or textured effects. Minor adjustments in the composition design to accomodate the decorative aggregate may be desirable, however.

Architectural Specifications for Floor and Deck Toppings

After many years of experience, architects have worked out a number of specifications for heavy-duty floor and deck toppings and decorative floor surfacing when curable epoxide mortar compositions are used for these purposes. Compositions formulated according to the teachings of this invention typically meet or exceed these specifications. The specifications call for a cure schedule of 20 hours at 77° F. (25° C.), followed by 4 hours at 158° F. (70° C.). (These curing conditions are convenient for use with samples, but not for actual flooring jobs.) When the epoxy binder is tested without the aggregate blended into it, it should have a flash point (ASTM-D-92, C.O.C.) of at least 150° F. for both Part A and Part B and a gel time of at least about 25 minutes. After cure of this appregate-free epoxy binder system, it should have a Shore D hardness (ASTM test D-2240) of at least about 70, a tensile strength of at least 2,500 p.s.i. according to a modified ASTM test D-638 (test rate 0.2 inches per minute using a C die described in ASTM test D-412), a tensile elongation of at least 25% using the aforementioned modified ASTM test D-638, a compressive strength (ASTM test D-695) of 18,000 p.s.i. (this value is considerably lowered when the aggregate is added), an adequate resistance to a variety of chemicals such as organic acids and alcohols and inorganic chemicals such as 10% HCl, 10% $HNO_3$, 10% NaOH, 10% $H_2SO_4$, salt water, and the like. In the case of epoxy mortar compositions specifically designed for decorative floor surfacing, the architectural specifications are somewhat less stringent; for example, Shore D hardness can be as low as 65, tensile strength as low as 2,000 p.s.i., tensile elongation as low as 20%, and compressive strength as low as 16,000 p.s.i. Other properties which can be considered include flexural strength, impact strength, linear shrinkage during curing, abrasion resistance, thermal coefficient of expansion, and the like.

When a cured sample comprising the complete mortar (including aggregate) is tested, the specifications are lowered to reflect the weakening of the cured structure normally created by the presence of the blended aggregate. Nevertheless, tensile strength should still exceed 1,750 p.s.i. for heavy-duty flooring (750 p.s.i. for decorative flooring), and compressive strength (ASTM test C-579) should exceed 7,500 p.s.i. for heavy-duty flooring and 5,000 p.s.i. for decorative flooring.

Typical physical properties of cured epoxy resin binders of this invention (no aggregate present) are set forth below.

Tensile strength: 5,700 p.s.i.
Elongation: 22%
Modulus of elasticity: $10 \times 10^4$ p.s.i.
Compressive strength: 28,300 p.s.i.
Yield point: 4,375 p.s.i.
Shore D hardness: 84/81
Gel time: 40-60 minutes A typical determination of gel time involves a two-fluid ounce sample of material at a temperature of 25° C., timed from the addition of Part B until a soft ball forms in the mixed material.

The above-described properties were measured on samples of a binder of this invention specifically adapted for use in decorative flooring. In the case of heavy-duty flooring, tensile strength and compressive strength are normally even higher. For the mortar (i.e.

aggregate added), physical properties of samples also exceed specifications by 100–400 p.s.i. in tensile strength and about 1,000–2,000 p.s.i. in compressive strength. These high values indicate a good bond between the aggregate and the cured epoxy resin binder matrix for the aggregate.

Part A of the Epoxy Binder

The Part A systems used in this invention are not greatly different from the usual Part A used in epoxide binders for mortar or in the curable liquid epoxide component of the two-part epoxy marking system described in U.S. Pat. No. 4,088,633 (Gurney), issued May 9, 1978; see columns 6 through 10 of this patent. One primary difference between the curable liquid epoxide of the U.S. Pat. No. 4,088,633 patent and the Part A of this invention is that "fast cure" diglycidyl ethers such as the diglycidyl ether of a methylol-substituted bisphenol A are not ordinarily used. In fact, the more conventional diglycidyl ethers of polyhydric phenols are preferred, so long as the viscosity of these so-called epoxy "resins" is sufficiently low. Because the present invention contemplates a Part A composition with a Brookfield viscosity at 25° C. of less than 3,000 centipose (c.p.s.), relatively high purity diglycidyl ethers with epoxide equivalent weights close to theoretical are particularly desirable. For example, the theoretical epoxide equivalent weight (EEW) of a diglycidyl ether of bisphenol A having no recurring units (i.e. having only one divalent residue of bisphenol A) is about 170. This compound is available (e.g. under the trademark "DER 332" and "DER 332 LC") in commercial quantities which are sufficiently pure to have EEW values below 180, e.g. below 176, and viscosities below 7,000 c.p.s., e.g. 3,000–6,500. Some commercial lots of these compounds may even have an EEW value which is equal or substantially equal to theoretical. Less pure versions of this compound, e.g with EEW values above 180 and typically approaching 200 are also available in viscosity ranges below 15,000 centipoise, sometimes even down to 7,000–10,000 c.p.s. These higher viscosity diglycidyl ethers can be used with suitable diluents (preferably amine-reactive diluents) for lowering the viscosity below 3,000 c.p.s. at 25° C. Even the purest diglycidyl ethers of bisphenol A are ordinarily thinned down with at least some diluent.

The major portion of the diluent for a Part A of this invention is normally a low molecular weight, low equivalent weight aliphatic monoglycidyl or polyglycidyl ether which is fully compatible with diglycidyl ethers of bisphenol A and which does not detract from the hydrophobic characteristics of this Part A. Glycidyl ethers of this type can have a viscosity at 25° C. in the hundreds of centipoise or less. The epoxide functionality of these diluents (or blends of diluents) is preferably selected so as not to significantly alter the preferred epoxide functionality of the principal epoxide component. Accordingly, this epoxide functionality will normally be adjusted to be greater than 1.0 and less than 3.0, e.g. 1.5–2.5. Typical curable or reactive diluents of this type include alkyl glycidyl ethers wherein the alkyl group typically contains 6 to 18 (preferably 8–10) carbon atoms, mononuclear monofunctional phenolic glycidyl ethers, aliphatic triglycidyl ethers derived from simple triols such as trimethylolethane, and the like. These compounds are typically obtained by reacting epichlorohydrin with the monohydric phenol or polyhydric aliphatic alcohol. All reactive diluents do not work with equal effectiveness, particularly with respect to the physical strength characteristics of the cured epoxy binder. Maximum strength appears to be obtained with binfunctional aliphatic glycidyl ethers which are derived from saturated aliphatic diols containing less than 12 carbon atoms. It is particularly desirable that the aliphatic diols (which can be reacted with epichlorohydrin to produce the diglycidyl ethers) have some cycloaliphatic character, a suitable example being a di-methylol-substituted cycloalkane such as 1,4-di(hydroxymethyl) cyclohexane.

Any of the aforementioned diglycidyl ethers can be water-thin, with Brookfield viscosities at 25° C. ranging from about 5 to about 100 c.p.s. These reactive diluents are commercially available, e.g. as "Epoxide No. 7" and "Epoxide No. 8" (trademark of Proctor and Gamble Co.), "CARDURA E" (trademark of Shell Chemical Co.), and "Heloxy MK-107" (trademark of Wilmington Chemical Corporation).

The major amount of Part A will normally be the diglycidyl ether of the polyhydric phenol, particularly when the aforementioned high purity, low viscosity diglycidyl ethers are selected. About 5–50% by weight of the Part A composition (e.g. 20–30% by weight) will typically be a diluent selected to keep the viscosity within the desired range. Ordinarily, this will provide sufficient dilution; however, a small amount of a different type of diluent (typically less than 10% by weight) can be added to adjust the volume of the liquid Part A, so that an essentially 1:1 by volume ratio of Part A:Part B will have the desired stoichiometry. This second diluent (which is preferably reactive also to preserve the "100% solids" character of the total system) is theoretically optional. However, a 1:1 by volume Part A:Part B blend is so desirable in practice as to be strongly preferred. Suitable second reactive diluents include various phenolic compounds, such as monohydric, monocyclic phenols substituted with at least one higher alkyl substituent, i.e. a straight or branched chain alkyl group having at least 7 carbon atoms. Dinonyl phenol (which is commercially available as such or in blends with up to about 20 or 25% mononyl phenol) is an example of such a diluent. This compound has good solvent properties, relatively low volatility, and a relatively high flash point. If a 1:1 A/B ratio is not used, it is nevertheless preferred to add some diluent to Part A so that the A/B ratio by volume will be a small integer or convenient fractional number, e.g. 1.5:1, 2:1, 2.5:1, 3:1, etc.

A very large contribution to the final strength characteristics of the cured epoxy binder system can be made by including a silane adhesion promoter. The adhesion-promoting functional group of these additives is typically a trialkoxy silane capable of hydrolyzing to $-Si(OH)_3$. These adhesion promoters can be either epoxy-reactive or amine-reactive. When terminated with a primary or secondary amino group, stearic hindrance can be minimized if the amino group is in the omega position of an aliphatic chain, e.g. gamma-propyl, beta-ethyl, etc. For convenience of use in the Part A system, it is preferred to form an amine-epoxide adduct from the adhesion promoter, i.e. the reaction product of the omega-aminoalkyl trialkoxy silane and a glycidyl ether, preferably a polyglycidyl ether. Among the suitable adducts of this type are beta-3,4(epoxycyclohexyl)ethyltrimethoxysilane and gamma-glycidoxypropyltrimethoxysilane. Both are available from Union Carbide Corporation under the trade designations "A-

186" and "A-187", respectively. Both of these compounds release methanol during hydrolysis. For efficiency of hydrolysis, the alkanol produced during hydrolysis should be relatively volatile and hence should be a lower alkanol. These adhesion promoters are sufficiently efficient to permit use in very small quantities, e.g. less than 5% by weight of the total Part A system, more typically 0.1-2% by weight.

The Part A system can be blended with any conventional high-shear mixer. The order of addition of ingredients is not critical, but, for convenience, the largest component (the diglycidyl ether of the dihydric phenol) is typically added first. Various optional ingredients can be added to the Part A composition, including pigments and compounds which assist in releasing trapped air or gases. One part by volume of Part A typically weighs slightly more than an equal volume of Part B, so that a 1:1 volume ratio tends to be about 1.1-1.5:1 Part A:Part B on a weight basis. For an A/B volume ratio of 2:1, the corresponding weight ratio is typically greater than 2:1 but less than 2.5:1.

The Part B of the Epoxy Binder System

Perhaps the most important component of the Part B component is the substantially water-insoluble, non-fused-ring, di-primaryamino-bi-cycloalkane. (By "non-fused" is meant rings which are independent of each other, particularly rings joined through a "bridge" such as methylene or 2,2-propane.) As noted previously, the di-primaryamino-bi-cycloalkane or other substantially water insoluble polynuclear cycloaliphatic polyamine has to be carefully selected for low compatibility with water, low viscosity, rapid and high-strength cures, etc. Typically, these preferred diamines have the formula $NH_2-A-X-B-NH_2$, wherein A and B are cycloalkane rings and X is a suitable "bridge" between the rings. Thus, the primary amino groups are preferably substituted directly on the cycloalkane rings. The "bridge" can be any suitable divalent substituent, including a divalent saturated lower aliphatic group. (A "lower" aliphatic group is considered to have less than 7 carbon atoms, while a "higher" aliphatic group is considered to have 7 or more.) Commercially available diamines of this type are ordinarily symmetrical, so that A and B are the same and the amino groups are substituted in the p- and p'-positions. Excellent results have been obtained with methylene-bis-(4-cyclohexyl amine), which is commercially available as "HLR-4219" and "HLR-4448" (trade designations of E. I. duPont deNemours and Co., Inc.). With these types of diamines, some isomerism is possible, and commercially available versions may contain mixtures of stereoisomers. Methylene-bis-(4-cyclohexylamine) is reported to be insoluble in water.

The amine equivalent weight of methylene-bis-(4-cyclohexylamine) and similar compounds can be calculated in various ways. Considering the amine functionality to be two primary amine groups, hence a functionality of essentially 2 (i.e. two "amino equivalents"), the "amino equivalent weight" is theoretically about 210 divided by 2, or about 105. It should be noted that each primary amine group can serve as a branch point for two chains in the curing of the epoxide, and the active-hydrogen equivalent weight is theoretically about 53.

The polynuclear cycloaliphatic polyamine can be the sole active hydrogen-containing compound in Part B. This polyamine can be "preadducted" with a polyglycidyl ether to increase the water-insensitivity of Part B. However, in those cases were Part B also contains an aliphatic polyamine, it is preferred to "preadduct" any such aliphatic amines and add the polynuclear cycloaliphatic polyamine to Part B after such adducts have been formed. It is ordinarily desirable to control viscosity and adjust the volume of Part B with a phenolic diluent, as explained in connection with the dilution of Part A. As in the case of Part A, the goal is to reduce viscosity of Part B below 3,000 c.p.s. and adjust the volume of the required stoichiometric amount of Part B to have some precise volume relationship (e.g. 1:1 or 2:1) to the required stoichiometric amount of Part A. Part B systems with a viscosity below 2,000 c.p.s. have been achieved in practice. (The viscosity of Part A is in a similar range.)

It is particularly preferred to include the aforementioned hydrophobic agent in Part B. However, there are other, less prefered methods for including this agent; hence the selection and chemical nature of this agent will be discussed in more detail subsequently. Before going on to this subsequent discussion, however, it should be noted that all hydrophobic agents are not equally effective in wetting out aggregate, compatibility with the total system, improving spreadability of the mortar, elimination of transfer to the spreading tools (e.g. trowels), reactivity in the system and effect upon the strength characteristics of the cured mortar, effect on viscosity, reducing the tendency of the epoxy binder system to stably emulsify or suspend droplets of water, and similar desiderata. Compounds which are considered to meet all or most of these criteria contain at least one primary amine group and at least one long-chain aliphatic group, e.g. an n-higher alkyl radical. Such compounds can have an extremely low surface tension, resulting in much improved lubrication of the mortar mix. The long-chain alkylamines such as hydrogenated tallow amine and stearyl amine are solids which can have undesirable effects upon the binder and the cured mortar. Tall oil amine, oleyl amine, and lauryl amine are liquids, which may have somewhat similar effects on the mortar. However, the best class of compounds for meeting the aforesaid criteria are the N-aliphatic-1,3-propane diamines. This class of compounds includes species which are liquid (e.g. N-oleyl-1,3-propanediamine) and which have relatively low equivalent weights as compared to stearyl amine and the like. A good description of this class of compounds can be found in U.S. Pat. No. 4,022,946 (Cummings), issued May 10, 1977 and in the trade literature of Ashland Chemicals (the "ADOGEN" (trademark) primary amines and diamines) and Armak Chemical ("DUOMEEN" (trademark) N-alkyl-1,3-propane diamine). A particularly important feature of these N-alkylpropylene diamines is the presence of the secondary amino group in addition to the primary amino group, which secondary amino group at least theoretically reduces the amine equivalent weight to half of the molecular weight—or, if the primary amino group is considered to have a functionality of 2, to one-third of the molecular weight. The average molecular weight of these N-alkyl propylene diamines is greater than 200, e.g. about 250 to about 375. If the amine functionality is considered to be 2.0, the amine equivalent weight would then range from 125 to about 188. When considering the amine functionality to be 3.0, this range becomes 83-125. In actual commercial practice, the molecular weight range tends to be about 270-350. Referring to the previously explained definition of "amino equivalents" (by which definition the N-alkyl propylenediamines would have amine equivalent weights equal to one-half their molecular weights), the ratio of "amino equivalents" of di-primary-aminobicycloalkane to N-aliphatic-1,3-propanediamine would range from about 0.5:1 to 2:1, more preferably 0.8:1 to about 1.5:1. Based on the weight of Part B, the N-aliphatic-1,3-propanediamine typically ranges from 15 to 40% by weight. Some loss of strength in the cured epoxy binder may be noted in the 30–40% by weight range, however. At a concentration of less than 15% by weight, the contribution of the N-aliphatic-1,3-propanediamine to the spreadability of the epoxy mortar becomes relatively borderline.

Preferred N-aliphatic-1,3-propanediamines include the N-coco-, N-tallow-, and N-oleyl species. The commercially available embodiments of these compounds are typically blends in which the N-alkyl of the secondary amine can vary over a range from $C_8$ to $C_{18}$ or higher. Occasionally, a fraction of a percent of N-hexyl- can be present. The most commonly occurring saturated N-higheralkyl groups are dodecyl, tetradecyl, hexadecyl, and octadecyl. Some tetradecenyl and hexadecenyl groups may be present, but the most commonly occurring unsaturated N-aliphatic groups are octadecenyl and octadecadienyl. The preferred N-higheralkyl-1,3-propanediamines are substantially insoluble (e.g. less than 0.5 weight-% soluble) in water at 25° C. The N-aliphatic-1,3-propanediamines can also be "adducted" with the diglycidyl ether of the polyhydric phenol. Indeed, this is a preferred procedure, since it improves the compatibility of these diamines in the system and also appears to improve their reactivity. Also, since these diamines typically comprise a mixture of molecular weights, a portion of the mixture being solids, the adducting step helps to solubilize all of the higher molecular weight portions and keep the Part B liquid and uniform. When using an approximately 1:1 ratio of "amino equivalents" (bicycloalkanediamine:N-aliphatic propylene diamine), which provides two cycloaliphatic primary amine groups for every aliphatic primary amine group; and about 0.2–0.3 epoxide rings for each amino equivalent of N-aliphatic-1,3-propanediamine (or about 0.15 epoxide equivalents per equivalent of active hydrogen of this diamine), the amount of dinonyl phenol needed to provide a 1:1 volume balance between Part A and Part B ranges from about 30 to 50 weight-percent, e.g. 35–45 weight-percent. By selecting the appropriate order of addition of the ingredients in Part B, the pre-adducting amount of epoxy resin can be caused to react substantially exclusively with the N-aliphatic propylenediamine, thereby assuring that the preadduct will be essentially a reaction product of a diglycidyl ether and this particular diamine, and thereby leaving the bicycloalkane diamine in a substantially unreacted, unadducted state. For ease of reactivity, the phenolic diluent (e.g. dinonyl phenol) can be added first, followed by the N-alkyl propylenediamine and then the diglycidyl ether of the polyhydric phenol. The bicycloalkane diamine can be added after the adduct is formed. Typically, about 3 to 5 amino equivalents of N-aliphatic propylenediamine are used per epoxy equivalent (about 5 to 8 equivalents of active hydrogen per epoxy equivalent), so that a large excess of amino equivalents remains, even before the bicycloalkane diamine is added to the Part B system.

The Hydrophobic Agent

Suitable hydrophobic agents used in this invention not only decrease the compatibility of the epoxy binder with water, they also typically lower surface tension and add to ease of spreadability of the mortar. To increase incompatibility with water, the hydrophobic agent should contain a higher aliphatic group, i.e. an aliphatic group having more than 6 carbon atoms. Aliphatic radicals with up to 30 or more carbon atoms are known, but the more commonly available higher aliphatic compounds contain 8 to 26 carbons. Aliphatic groups with odd numbers of carbon atoms are available, but $C_8$, $C_{10}$, $C_{12}$, $C_{14}$, $C_{16}$, and $C_{18}$ are more common. Alkenes, alkadienes, and alkatrienes have sufficient aliphatic character for use in this invention. The surface tension-lowering effect is generally provided by the combination of the higher aliphatic group and a polar group, which polar group can be an amine (as explained previously), an oxyethylene chain, amides and similar polar radicals. If the polar group is essentially inert toward epoxides and amines (as is the case with the oxyethylene chain and the amide), the hydrophobic agent can theoretically be premixed with either Part A or Part B or both Parts, the preferred procedure being to add the agent to Part B. If good distribution throughout the epoxy binder can be obtained by adding the hydrophobic agent as a third component, such addition is permissible, but not preferred. For example, it is ordinarily not preferred to preblend the aggregate with the hydrophobic agent. It is difficult to explain why this should be the case, since it would ordinarily be expected that any hydrophobic treatment of the aggregate would improve the bond between the aggregate and the epoxy binder. This expectation has not been realized in practice, hence the preference for premixing the hydrophobic agent with one or both Parts of the epoxy binder.

Adequate results have been obtained through the use of a soap (a metal salt of a higher carboxylic acid) such as aluminum stearate as the hydrophobic agent. Adequate results have also been obtained with a commercially available composition known as "FOAMKILL 652 C", a liquid having a viscosity of about 300 c.p.s., a flash point in excess of 320° F., and a pH (2% solution) of 5.0. "FOAMKILL 652 C" is a trademark of Crucible Chemical Company of Greenville, S.C. The particular "FOAMKILL" preferred for use in this invention (No. 652 C-EC) is believed to be comprised of an aliphatic hydrocarbon oil, an alkyl (probably higher alkyl) phenoxy poly(ethyleneoxy) ethanol type of surfactant, and a thixotrope or thickener such as finely divided silica having a particle size in the sub-micron range.

Water and Aggregate

Any of the conventional types or mortar aggregates can be used in this invention, the preferred aggregate being silica sand. For decorative flooring, it is preferred to add at least some colored aggregate to the mortar. A typical example of a particle size distribution for silica sand or other aggregate is disclosed in Example 1 of U.S. Pat. No. 2,943,953 (Daniel), issued July 5, 1960. Aggregate particles which are not retained on a 100 U.S. mesh screen are generally considered too fine for use in a mortar of this type, while sand too coarse to be retained on a 16 mesh screen can be equally undesirable. Colored granules for decorative flooring can be ceramic-coated quartz, roofing granules, or the like. Such granules are commercially available, e.g. "TWEED TEX" (trademark of 3M Company). Ordinarily, at least 200 parts of aggregate should be used for each 100 parts of epoxy binder, the preferred range being 700–1,000 parts per 100 by weight.

As noted previously, the water can be preblended with the aggregate. An amount of water which will be a lubricating amount varies with the system, but typically at least about 3 or 4% by weight of water, based on the weight of the aggregate, is needed to provide the lubricating amount. A more typical lubricating amount of water is 8–13% by weight, based on the weight of the aggregate. There does not appear to be any absolute upper limit on the amount of water which can be blended with the aggregate; however, no significant advantage has been noted in using more than 15% by weight of water. The water can be plain tap water, and the use of thickeners, surfactants, and the like in the water phase is purely optional.

Inert Ingredients

In addition to fillers, pigments, and the like, other inert ingredients can be included in the epoxy binder system, but their use is optional and ordinarily not preferred. Preferred epoxy binder systems of this invention are essentially 100% solids, in that no volatile material remains after cure. Substantially inert diluents can be substituted in whole or in part for the reactive diluents described previously. Among such essentially inert diluents are synthetic higher alkyl-substituted benzenes (e.g. a synthetic alkyl benzene in which the side chain is branched and contains an average of 13 carbon atoms), acylated alkadiols (e.g. 2,2,4-trimethyl-1,3-pentanediol, diisobutyrate), diesters of dicarboxylic acids (including aromtic dicarboxylic acids), hydrogenated terphenyls, and other low viscosity hydrocarbons, esters, etc.

The principle and practice of this invention is illustrated in the following Examples, wherein all parts and percentages are by weight unless otherwise indicated.

EXAMPLES 1–10 and 1M–12M And Comparative Examples C-1 and C-1M – C-5M

The following materials, used in these Examples, were specific commercially-supplied compositions identified in detail below.

"DER-331" (trademark of Dow Chemical Co.): diglycidyl ether of Bisphenol A; epoxy equivalent weight (EEW): 186–192; viscosity: 11,000–14,000 centipoise (cps).

"DER-332" (trademark of Dow Chemical Co.): diglycidyl ether of Bisphenol A; EEW: 172–176 viscosity: 4,000–5,000 cps.

"HELOXY MK-107" (trademark of Wilmington Chemical Corp.): diglycidyl ether of 1,4-di(hydroxymethyl) cyclohexane; EEW: 165; viscosity: 60 cps.

"SILANE A-187" (trademark of Union Carbide Corp.): gammaglycidoxypropyltrimethyoxysilane.

"VARI-TONE" (trademark of Burns and Russell Co.): 40–50 U.S. mesh, colored ceramic coated silica sand.

"F-40" (trademark of Burns and Russell Co.): hydrophobic-coated silica sand.

"HLR-4219" and "HLR-4448" (trade designations of the DuPont Co.): cis-trans isomeric mixture of methylene-bis-(4-cyclohexyl amine); the amount of trans-isomer has the following effects upon melting point.

"HLR-4448" (higher in trans): 42°–44° C.
"HLR-4219": 15°–16° C.
Boiling point (for both isomeric mixtures): 320° C. Amino equivalent weight (equiv. wt. per amine group, regardless of whether 1° or 2°): 105–110. Active-hydrogen equivalent weight: 52.5–55. Flash point: 161° C.

"ALYLATE 31" (trademark of Chevron Chemical Co.): synthetic branched-chain $C_{13}$—allkyl substituted benzene. Viscosity at 100° F., USS (ASTM D446): 51.8 Flash point, C.O.C. (ASTM D-92): 280° F. Distillation (ASTM D447): 5% recovered at 548° F.; 95% recovered at 595° F.

"FOAMKILL 652C-EC" (trademark of Crucible Chemical Co.): blend of aliphatic hydrocarbon oil, alkylphenoxypoly(ethyleneoxy) ethanol surfactant, and colloidal silica thixotrope.

"DEGUSSA R-972" (trademark): hydrophobic colloidal silica thixotrope.

"DUOMEEN C" and "DUOMEEN C SPECIAL": (trademarks of Armak Chemical): N-coco-1,3-propanediamine; apparent molecular weight: 276; boiling point (at 1.0 atm): 300° C.; flash point: 295° F. (C.O.C.); according to analyzses by the supplier, the "C" and "C-Special" differ in that "C-Special" is purer; see data below regarding saturated and unsaturated N-alkyl chain length:

"DUOMEEN C" 0.5% N-hexyl; 8% N-octyl, 7% N-decyl, 50% N-dodecyl, 18% N-tetradecyl, 8% N-hexadecyl, 1.5% N-octadecyl, 6% N-octadecenyl, 1% N-octadecadienyl. Melting point (approx.): 71° F.

"DUOMEEN C-SPECIAL": 7% N-octyl; 6.5% N-decyl; 53% N-dodecyl; 19% N-tetradecyl; 8.5% N-hexadecyl; 1% N-octadecyl; 5% N-octadecenyl. Melting point (approx.): 80° F.

Hereinafter, these materials will be identified by trademark as follows: "DER-331" (t.m.), etc.

COMPARATIVE EXAMPLES C-1 THROUGH C-5

EXAMPLES C-1 through C-3

| Part A | | Part B | |
|---|---|---|---|
| Ingredient | Parts/Wt. | Ingredient | Parts/Wt. |
| "DER-331" (t.m.) | 66 | Trimethyl-hexamethylene-diamine* | 27.8 |
| "HELOXY MK-107" (t.m.) | 30 | | |
| "SILANE A-187" (t.m.) | 1 | Cresyl glycidyl ether (EEW:185) | 30.0 |

*Supplied by Veba-Chemie, A.G., Mol. Wt.: 158.3
Active-hydrogen equiv. wt.: 39.6; melting pt.: −80° C.; boiling pt. (at 1.0 atm: 232° C.

-continued
COMPARATIVE EXAMPLES C-1 THROUGH C-5

Example C-4

| Part A | | Part B | |
|---|---|---|---|
| Ingredients | Parts/Wt. | Ingredients | Parts/Wt. |
| Same as C-1 through C-3 | | Trimethyl-hexamethylene-diamine | 28 |
| | | Cresyl glycidyl ether | 30 |
| | | Dinonyl phenol | 20 |
| | | "ALKYLATE 31" (t.m.) | 10 |
| | | Aluminum stearate | 12 |

Example C-5

| Part A | | Part B | |
|---|---|---|---|
| Ingredients | Parts/Wt. | Ingredients | Parts/Wt. |
| Digylcidyl ether of Bisphenol A ("EPON 820" t.m. of Shell Chem. Co. | 100 | "Curing Agent RSC-143" (trademark of Shell Chemical Co.) | 50 |

EXAMPLE C-6: Commercial Two-Part Epoxy Binders and Mortars Used as Floor Toppings Reported compressive and tensile strength properties of some of these commercially available prior art compositions are not always specific as to whether they were tested with or without aggregate. The most specific reported data presently available are set forth below.

| Name of Product | Test Conditions | Tensile Strength, psi | Compressive Strength, psi |
|---|---|---|---|
| DURALITH | tested as mortar, 1:3 binder:aggregate | >1300 (after 24 hr) | >8000 (after 24 hr) >12000 (after 48 hr) |
| DEX-O-TEX, Industrial | Tensile: ASTM C-190 Compressive: ASTM C-306 (2" × 2" cubes) | 1183 | 5315 |
| DEX-O-TEX | same as Industrial | 1033 | 7025 |

The mortar formulas for epoxy-amine resins of Examples C-1 through C-5 are set forth below. The order in which ingredients are listed indicates the order of addition. All ingredients prior to water are blended together, then water is added and mixed into the previously obtained blend.

| Example | Ingredient | Amount (pts/Wt.) |
|---|---|---|
| C-1M | Part A + Part B, preblended in (97/57.8 by weight A:B ratio) | 100 |
| | 40-50 U.S. mesh silica send (No. 4 grade) | 800 |
| | Water | 100 |
| C-2M | Part A + Part B (preblended as in Ex. C-1) | 100 |
| | "F-40" (t.m.) | 800 |
| | Water | 100 |
| C-3M | 40-50 U.S. mesh silica send | 800 |
| | Aluminum stearate (melted onto silica sand at 210° F.) | 20 |
| | Part A + Part B (preblended as in Ex. C-1) | 100 |
| | Water | 100 |
| C-4M | 40-50 U.S. mesh silica sand (No. 4 grade) | 800 |
| | Part A + Part B (as recited in Ex. C-4) | 100 |
| | Water | 100 |
| C-5M | "F-40" (trademark) | 800 |
| | Part A + Part B (as recited in Ex. C-5) | 100 |
| | Water | 72 |

(Note: This Example C-5M represents a mortar formula used in preparing a troweled floor system proposed by the Shell Chemical Co.)

Troweled floor systems prepared from the blended mortar formulas of Examples C-1M to C-5M were found to have certain inherent problems according to a number of factors. Problems encountered were related to the ease of application of the mortar formula.

The commercially available systems of Example C-6 are labor-intensive in their installation. For example, the following installation steps are recommended by Crossfield Products Corp., manufacturers of DEX-O-TEX HI-REZ CHEMINERT Flooring.

(A and B) Prepare surface and apply waterproof membrane if specified;
(C) Apply bonding coat;
(D) Trowel on ¼ inch body coat of DEX-O-TEX;
(E) Apply two top coats to fill in and smooth off body coat.

For DEX-O-TEX industrial flooring, power sanding to removel trowel marks is recommended. The mortar formulas of Examples C-1M and C-5M were found to be difficult to trowel due to excessive stickiness. In working with the mortar formulas of Examples C-2M and C-3M, some of the epoxy binder was observed to transfer to the trowel creating a drag on the trowel. The addition of aluminum stearate as a hydrophobe in Part B of the epoxy binder of Example C-4M did lessen the problems of stickiness and drag on the trowel. However, it also raised the viscosity of the epoxy binder, making the mortar more cohesive and initially difficult to spread out.

The consistent problem encountered in the troweled floor systems prepared from the mortar formulas of Examples C-1M to C-5M was poor compression and tensile strength. For example, a comparison of an industrial floor covering as prepared according to the present invention (according to Example 8M, described hereinafter) with that obtained according to Example C-5M (available commercially from Shell Chemical Co.) showed the following results:

EXAMPLE C-5M compressive strength (ASTM C-579): 2200 psi
tensile strength (ASTM C-307): 400 psi

EXAMPLE 8M, Mortar Formula #2 compressive strength (ASTM C-579): 9380 psi
tensile strength (ASTM C-307): 2030 psi As noted previously, commercially available prior art flooring systems can provide excellent compressive strength and tensile strength; however, they typically evidence problems of application in being sticky, cohesive, and difficult to spread out and compact into a smooth, tight finished floor covering.

The following Examples 1 through 10 recite the ingredients used in preparing the epoxy-amine resin systems.

| | | Examples 1 through 10 | | |
|---|---|---|---|---|
| | Part A | | Part B | |
| Ex. | Ingr. | Parts/Wt. | Ingr. | Parts/Wt. |
| 1 | Same as Ex. C-1 | 104 | "HLR-4219" or "HLR-4448" (t.m.) (active hydrogen eq. wt.: 52.6) | 30 |
| | | | Dinonyl phenol | 30 |
| | | | Aluminum stearate | 10 |
| 2 | Same as Ex. C-1 | 97 | "HLR-4219" (t.m.) | 29 |
| | | | Dinonyl phenol | 40 |
| | | | Aluminum stearate | 10 |
| 3 | "DER-331" (t.m.) | 72 | "HLR-4219" (t.m.) | 29 |
| | | | Dinonyl phenol | 30 |
| | "HELOXY MK-107" (t.m.) | 25 | "ALKYLATE 31" (t.m.) | 10 |
| | "SILANE A-187" (t.m.) | 1 | Aluminum stearate | 11 |
| 4 | Same as Ex. 3 | 98 | "HLR-4219" (t.m.) | 29 |
| | | | Dinonyl phenol | 30 |
| | | | "ALKYLATE 31" (t.m.) | 10 |
| | | | "FOAM KILL 652C-EC" (t.m.) | 5 |
| 5 | Same as Ex. 3 | 98 | Same as Ex. 4 but without the 5 parts "FOAM KILL 652C-EC" (t.m.) | 69 |
| 6 | "DER-331" (t.m.) | 72 | "HLR-4219" (t.m.) | 23 |
| | "HELOXY MK-107" (t.m.) | 25 | Dinonyl phenol | 30 |
| | | | "DUOMEEN C" (t.m.) | 18.2 |
| | "SILANE A-187" (t.m.) | 0.5 | "DER-332" (t.m.) | 7.8 |
| | "FOAM KILL 652C-EC" (t.m.) | 5.0 | (The "DUOMEEN C" and "DER-332" were preadducted) | |
| | "DEGUSSA R-972" (t.m.) | 2.0 | | |
| | "DER-331" (t.m.) | 68.0 | Same as Ex. 6 | 79 |
| | "HELOXY MK-107" (t.m.) | 25.0 | | |
| | "SILANE A-187" (t.m.) | .5 | | |
| | White Tint paste[a] | 8.0 | | |
| | Black Tint paste[b] | .2 | | |
| | "FOAMKILL 652C-EC" (t.m.) | 5.0 | | |
| | "DEGUSSA R-972" (t.m.) | 1.0 | | |

[a] 1/1 ratio of TiO$_2$/"DER-331" (t.m.)
[b] Carbon/"DER-331" (t.m.)

-continued

Examples 1 through 10

| Ex. | Part A Ingr. | Parts/Wt. | Part B Ingr. | Parts/Wt. |
|---|---|---|---|---|
| 8 | "DER-331" (t.m.) | 72.0 | "DUOMEEN C SPECIAL" (t.m.) | 24.0 |
|   | "HELOXY MK 107" (t.m.) | 25.0 | "DER-332" (t.m.) | 10.0 |
|   | "SILANE A-187" (t.m.) | .5 | Dinonyl phenol (Adducted) | 30.4 |
|   | "FOAMKILL 652C-EC" (t.m.) | 5.0 | "HLR-4219" | 20.0 |
|   | "DEGUSSA R-972" (t.m.) | 1.5 | | |
| 9 | Same as Part A of Ex. 7 | 107.7 | "DUOMEEN C SPECIAL" (t.m.) | 16.0 |
|   | plus | | "DER-332" | 7.0 |
|   | Dinonyl phenol | 21.0 | Nonyl phenol (Adducted) | 9.0 |
|   | | | "HLR-4219" (t.m.) | 23.0 |
| 10 | "DER-331" (t.m.) | 72.0 | Dinonyl phenol | 40.48 |
|   | "HELOXY MK-107" (t.m.) | 25.0 | "DUOMEEN C. SPECIAL" (t.m.) | 28.57 |
|   | "SILANE A-187" (t.m.) | .5 | "DER-332" (t.m.) | 8.33 |
|   | Dinonyl phenol | 2.5 | "HLR-4219" (t.m.) | 22.62 |

The pre-blended resin binders of Examples 1 through 10 are then mixed with aggregate to prepare the mortar formulas as described below in Examples 1M through 12M. Except where otherwise noted in these examples, all ingredients, except water, are blended together in the order listed, then water is added and mixed in to obtain the mortar. The compressive and tensile strengths of the cured mortar were determined according to ASTM test C-579 and ASTM test C-307, respectively.

| Example | Ingredient | Amount (pts./wt.) |
|---|---|---|
| 1M | Part A + Part B (preblended as in Ex.1 in 104/70 by weight A:B ratio) | 100 |
|  | Silica sand (40–50 U.S. mesh) | 800 |
|  | Water | 80 |

This mortar formula was found to have certain advantages over the mortar formula of Example C-4M. It was easier to spread on troweling, had less surface stickiness and had a better release of water to the surface. After application, the epoxy binder cured to a hard finish and the finished flooring had a high compressive strength. Although the theoretical basis for the hard cure and high compressive strength is not completely understood, it is presently thought to be due to the presence of the cycloaliphatic amine, HLR-4219 or HLR-4448, in the epoxy resin binder.

Compressive strength = 7000 to 8400 psi

| Example | Ingredient | Amount (pts.wt.) |
|---|---|---|
| 2M | Part A + Part B (preblended as in Ex. 2 in 97/79 by weight A:B ratio) | 100 |
|  | "VARI-TONE" (t.m.) | 800 |
|  | Water | 100 |

As compared to the mortar formula of Example 1, this mortar formula exhibited the same good troweling properties. However, its cohesiveness gave some initial difficulty in spreading it out and there was not as good a release of water to the surface. This internal retention of water is thought to be due to the presence of the ceramic coated silica sand as opposed to the uncoated silica sand in the mortar formula of Example 1.

Compressive strength = 3600 psi

| Example | Ingredient | Amount (pts/wt.) |
|---|---|---|
| 3M | Part A + Part B (preblended as in Ex. 3 in 98/80 by weight A:B ratio) | 100 |
|  | 40–50 U.S. mesh silica sand[a] | 800 |
|  | Water | 72 |

[a] two mortar formulas were prepared for comparison using two different types of silica sand:
1. uncoated silica sand (No. 4 grade)
2. "F-40" (t.m.)

Of two mortar formulas prepared using coated and uncoated silica sand, both exhibited similar good properties in regard to ease of trowelling, release of water to the surface, and a lower cohesiveness due to viscosity reduction from the addition of "ALKYLATE 31" (t.m.). The primary difference between the two mortar formulas was an increased compressive and tensile strength noted for the formula using the uncoated silica sand.

Compressive strength (ASTM Test C-579)

With uncoated No. 4 grade silica sand = 6700 psi
With "F-40" (t.m.) = 5900 psi

Tensile Strength (ASTM Test C-307)

With uncoated No. 4 grade silica sand = 1400 psi
With "F-40" (t.m.) = 1350 psi

| Example | Ingredient | Amount (pts/wt.) |
|---|---|---|
| 4M | Part A + Part B (preblended as in Ex. 4 in 98/74 by weight A:B ratio) | 100 |
|  | 40–50 U.S. mesh silica sand (No. 4 grade) | 800 |
|  | Water | 72 |

Of all the mortar formulas reported in the examples thus far, this formula was the easiest of all to spread out. It also exhibited an excellent water release and a lower viscosity and cohesiveness than the mortar formula of Example 3M. A higher compressive and tensile strength and the ease of trowelling are thought to be due to the use of "FOAMKILL 652C-EC" in place of the Aluminum stearate used in Example 3M.

Compressive strength (ASTM Test C-579)=7270 psi
Tensile strength (ASTM Test C-309)=1780 psi

| Example | Ingredient | Amount (pts/wt.) |
|---|---|---|
| 5M | Part A + Part B (preblended as in Ex. 5 in 98/69 by weight A:B ratio) | 100 |
| | 40-50 U.S. mesh silica sand[a] | 800 |
| | Water | 72 |

[a] two comparison mortar formulas were prepared using two different types of silica sand:
1. uncoated silica sand (No. 4 grade)
2. "F-40" (t.m.)

This mortar formula is the same as that for Example 4M, except for the absence of the hydrophobe, "FOAMKILL" (t.m.). The mortar formula containing uncoated silica sand proved to be difficult to trowel and having a low cohesiveness. Using the hydrophobic coated "F-40" silica sand, gave a mortar that had troweling properties similar to that of Example 4M. Although the resultant mortar containing the uncoated silica sand had higher compressive and tensile strength than the comparison mortar using the hydrophobic "F-40" silica sand, both were inferior in these properties to the mortar formula of Example 4M.

Mortar formula containing uncoated silica sand

Compressive strength (ASTM Test C-579)=6875 psi
Tensile strength (ASTM Test C-307)=1500 psi Mortar formula containing "F-40" (t.m.)

Compressive strength (ASTM Test C-579)=6570 psi
Tensile strength (ASTM Test C-307)=1380 psi

| Example | Ingredient | Amount (pts/wt.) |
|---|---|---|
| 6M | Part A + Part B (preblended as in Ex. 6 in 104.5/79 by weight A:B ratio) | 100 |
| | Silica sand (No. 4 grade) | 800 |
| | Water | 72 |

The mortar formula according to this example exhibited the best properties of any of the previously recited examples in regard to ease of application and strength of the resultant surface. Finished surface of the flooring was tight and smooth.

Compressive strength (ASTM Test C-579)=9500 psi
Tensile strength (ASTM Test C-307)=2000 psi

| Example | Ingredient | Amount (pts/wt.) |
|---|---|---|
| 7M | 40-50 U.S. mesh silica sand (No. 4 grade) | 800 |
| | Water | 72 |
| | Part A + Part B (preblended as in Ex. 7 in 107.7/79 by weight A:B ratio | 100 |

The mortar formula of Example 7M is essentially the same as that prepared according to Example 6M above, except for the addition of tint to Part A of the epoxy-amine resin system to give a gray binder. In Example 7M, however, the water was pre-blended with the silica sand before the epoxy-amine resin was added. This mortar formula showed the same ease in application as was noted for the mortar formula of Example 6M. Accordingly, order of addition of ingredients appeared to have no affect on the mortar or on the strength or appearance of the finished flooring. The following strengths were measured on the cured mortar:

Compressive strength=9500 psi
Tensile strength=2200 psi

The following examples 8 through 10 summarize the effect on the resultant mortar blend of the use of different aggregates. The various types of aggregate materials are specific commercially available products identified as follows:

"SILICA 4Q-ROK" and "SILICA 2Q-ROK" (trademarks of Pennsylvania Glass Co.) an angular silica sand.

"COLOR QUARTZ" granules (trademark of 3M Co.) 40-50 mesh No. 4 grade colored, ceramic coated silica sand.

"VARI-TONE" (trademark of Burns and Russell Co.) 40-50 U.S. mesh colored, ceramic coated silica sand.

No. 3 and No. 4 grade uncoated silica sand. Banding silica sand (available from Ottawa Silica Co.)

The materials identified by trademark will be referred to hereinafter as follows:

"SILICA 4Q-ROK" (t.m.), etc.

| Example | Ingredient | Amount (pts/wt.) |
|---|---|---|
| 8M | Silica 4Q-ROK | 266.7 |
| | Silica 2Q-ROK | 266.7 |
| | Banding sand | 266.7 |
| | Water | 72. |
| | Part A + Part B (preblended as in Example 7M) | 100 |

This mortar formula differs from that of Example 7M only in use of an aggregate of a mixture of silica sand of non-uniform shape and size. This was the best mortar formula of all the examples in both ease of application and appearance of the finished flooring. The angular silica sand made the mortar formula looser and easier to spread than the corresponding formula of Example 7M. The appearance of the finished floor was tight and smooth with a uniform gradation. The strength of the cured mortar was essentially the same as that of Example 7M:

Compressive strength=9380 psi
Tensile strength=2030 psi

| Example | Ingredient | Amount (pts/wt.) |
|---|---|---|
| 9M | Colored, ceramic coated silica sand[a] | 700 |
| | Water | 70 |
| | Part A + Part B (preblended as in Ex. 6M) | 100 |

[a] two comparison mortar formulas were prepared using two different commercially available sand aggregates:
1. "COLOR QUARTZ" granules
2. "VARI-TONE" granules The epoxy-amine resin system of Example 6 was used to prepare two mortar formulas each containing the aggregates as noted. The water and silica sand in both mortar formulas were preblended prior to the addition of the binder resin. The use of the ceramic coated versus uncoated silica sand made the mortar formula more cohesive and harder to spread out, but water did release to the surface to provide lubrication and a good close-off in the cured floor. The mortar containing "VARI- TONE" (t.m.) was somewhat easier to trowel than that containing the "COLOR QUARTZ" (t.m.) granules. In both instances, the binder in the finished floor had a milky appearance. The use of these ceramic coated silica sands resulted in a lower strength in the finished floor:

(1) "COLOR QUARTZ" (t.m.) granules

Compressive strength = 6350 psi
Tensile strength = 1230 psi (2) "VARI-TONE" (t.m.) granules Compressive strength = 5600 psi
Tensile strength = 1000 psi

| Example | Ingredient | Amount (pts/wt.) |
|---------|-----------|------------------|
| 10M | "COLOR QUARTZ" (t.m.) granules | 750 |
|  | Water | 72 |
|  | Part A + Part B (preblended as in Ex. 8 in 104/84.4 by weight A:B ratio) | 100 |

This mortar formula uses an epoxy-amine resin which is essentially the same as that used in Examples 6 and 7, except for the presence of: "DUOMEEN C SPECIAL" (t.m.), a purer grade of "DUOMEEN C" (t.m.) with an active hydrogen equivalent weight of 92. This mortar formula also differs from that of Examples 6M and 7M in the use of a ceramic coated versus uncoated silica sand. As compared to these two examples using an uncoated silica sand, the water released to the surface and lubrication were not quite as good. As compared to the mortar formula of Example 9M, the mortar formula of this example is looser, easier to spread out, yields a flooring without a milky appearance of the cured binder. The strength of the finished flooring was essentially the same as that prepared from the mortar formula of Example 8M, using the same aggregate.

Compressive strength = 6830 psi
Tensile strength = 1170 psi

| Example | Ingredient | Amount (pts/wt.) |
|---------|-----------|------------------|
| 11M | Silica 4Q-ROK or Silica 2Q-ROK | 400 |
|  | Silica sand, No. 3 grade | 200 |
|  | Banding sand | 200 |
|  | Water | 72 |
| as in | Part A + Part B (preblended Ex. 9 in 2/1 by volume A:B ratio) | 100 |

The 2/1 by volume A:B ratio used in the mortar formula of this example, is distinctly different from that of the mortar formulas of the other example, and contributes exceptionally good properties. The mortar is very much more fluid, loose and easy to spread out, well lubricated, and does not exhibit transfer of the epoxy-amine resin to the trowel. The mortar shows an excellent release of water to the surface and the cured mortar has a tight smooth surface with very good strength properties:

Compressive strength = 9500 psi
Tensile strength = 1910 psi

| Example | Ingredient | Amount |
|---------|-----------|--------|
| 12M | "COLOR QUARTZ" (t.m.) granules | 200 lbs. |
|  | Indusmin granules | 100 lbs. |

| Example | Ingredient | Amount |
|---------|-----------|--------|
|  | Water | 4 gal. |
|  | Part A + Part B (preblended as in Ex. 10 in 1/1 by volume A:B ratio) | 5 gal. |

This mortar formula has excellent properties, both in ease of application and in the appearance of the cured surface. Mortar has excellent water lubrication and the finished surface has a smooth, tight and sealed appearance, with good strength properties:

Compressive strength = 6200 psi
Tensile strength = 1200 psi

What is claimed is:

1. A method for coating a surface with an epoxide mortar comprising the steps of:
   (a) blending together the following substantially compatible components to form a curable epoxide binder material:
      1. a substantially water insoluble curable vicinal epoxide composition including a polyglycidyl ether of a polyhydric phenol, said polyglycidyl ether having an epoxide functionality greater than 1 but less than about 3,
      2. a substantially water insoluble polynuclear cycloaliphatic polyamine having a primary amine functionality greater than 1 but less than 4,
      3. a hydrophobic agent, which agent includes a higher aliphatic group and a polar group;
   (b) adding at least 200 parts by weight of aggregate and a lubricating amount of water to each 100 parts by weight of said curable epoxide binder material, thereby forming a curable epoxide mortar containing a substantially incompatible water phase generally uniformly distributed through said epoxide mortar;
   (c) spreading a layer of said epoxide mortar onto a surface and permitting at least a portion of said substantially incompatible water phase to form a film of water on the top of said layer; and
   (d) curing said curable epoxide binder material in said layer to a thermoset solid.

2. A method according to claim 1 wherein said spreading step includes trowelling.

3. A method according to claim 2 wherein said curing of said curable epoxide binder occurs substantially spontaneously through interaction of said vicinal epoxide and said polyamine under normal ambient conditions.

4. A method according to claim 1 wherein said polynuclear cycloaliphatic polyamine is a non-fused ring, binuclear di(primaryamino) cycloalkane compound having a primary amine group on each non-fused cycloalkane ring.

5. A method according to claim 4 wherein each said non-fused cycloalkane ring is a six-member carbocyclic ring.

6. A method according to claim 5 wherein said hydrophobic agent is selected from the group consisting of:
   (a) a metal salt of a higher alkanoic acid;
   (b) a higher alkyl phenoxy poly(oxyethylene) ethanol surfactant; and
   (c) an amine of the formula R—NH—A—NH$_2$, wherein R represents an open-chain, higher aliphatic radical and A is a lower alkylene radical.

7. A method according to claim 1 wherein said epoxide binder material has a Brookfield viscosity less than 12,000 c.p.s. and comprises:
   (a) a diglycidyl ether of bisphenol A having an epoxide equivalent weight ranging from about 160 to about 1,000;
   (b) a bis (primary aminocyclohexyl) methane;
   (c) an N-higher alkyl-1,3-propane diamine; and
   (d) a silane adhesion promoter.

8. A method according to claim 1 wherein said lubricating amount of water is at least 5% by weight, based on the weight of said aggregate.

9. A two-part curable epoxy binder system for use in binding together an aggregate having a Brookfield viscosity less than 3,000 centipoise when initially blended and before curing, said system comprising:
   in a first part having a Brookfield viscosity less than 3,000 centipoise, a substantially water insoluble curable vicinal epoxide composition comprising a polyglycidyl ether of a polyhydric phenol having an average epoxide functionality greater than 1 but less than 3 and an amine-reactive, viscosity reducing diluent therefor, for reducing the viscosity to below 3,000 centipoise;
   in an active hydrogen, epoxide-reactive second part capable of curing said first part,
      (a) a substantially water-insoluble, non-fused ring, di-primaryamino-bi-cycloalkane and
      (b) a substantially water insoluble N-higher aliphatic alkyl-1,3-propane diamine, the ratio of amino equivalents of said compound (a) to said compound (b) ranging from about 0.5:1 to about 2:1.

10. A two-part curable composition according to claim 9 wherein said polyglycidyl ether of a polyhydric phenol is a polyglycidyl ether of bisphenol A having an epoxide equivalent weight ranging from about 170 to about 200.

11. A two-part curable composition according to claim 9 wherein said di-primaryamino-bi-cycloalkane is bis(4-aminocyclohexyl) methane.

12. A patching kit for aggregate-filled, cured epoxide coatings comprising the two-part epoxy binder system of claim 9, and, packaged with said two-part epoxy binder system but in a container separate from said two-part epoxy binder system:
   a mortar-forming amount of aggregate, said amount being at least 200 parts by weight per 100 parts by weight of said two-part epoxy binder system, and
   a lubricating amount of water, said lubricating amount being at least 5% by weight of said aggregate.

13. A patching kit according to claim 12 wherein said lubricating amount of water is preblended with said aggregate to provide water-moistened aggregate in said container.

* * * * *

UNITED STATES PATENT AND TRADEMARK OFFICE
CERTIFICATE OF CORRECTION

PATENT NO. : 4,180,166
DATED : December 25, 1979
INVENTOR(S) : Vernon H. Batdorf It is certified that error appears in the above-identified patent and that said Letters Patent are hereby corrected as shown below:

```
Column 1,  line 16, for "tought" read --tough--.
Column 3,  line 19, for "adhesives)," read --adhesives,--.
Column 6,  line 28, for "typicaly" read --typically--.
Column 8,  line 68, for "time" read --them--.
Column 9,  line 25, for "nor" read --not--.
Column 9,  line 67, for "design" read --designed--.
Column 12, line 18, for "Heloxy" read --HELOXY--.
Column 16, line 55, for "or" read --of--.
Column 17, line 1,  delete "of 3M Company".
Column 17, line 34, for "aromtic" read --aromatic--.
Column 17, line 50, for "176 vis" read --176; vis--.
Column 18, line 38, for "analyzses" read --analyses--.
Column 19, line 59, for "send" read --sand--.
Column 19, line 68, for "send" read --sand--.
Column 21, line 8,  for "removel" read --remove--.
```

Signed and Sealed this

Fourteenth Day of October 1980

[SEAL]

Attest:

SIDNEY A. DIAMOND

Attesting Officer     Commissioner of Patents and Trademarks